CERT OF CORR
ON LAST PAGE

Patented Jan. 3, 1950

2,493,364

UNITED STATES PATENT OFFICE 2,493,364

POLYMERIC ADDITION PRODUCTS OF REACTIVE METHYLENIC COMPOUNDS AND SULFONE-ACTIVATED ETHYLENIC COMPOUNDS

Dwight L. Schoene, Naugatuck, Conn., assignor to United States Rubber Company, New York, N. Y., a corporation of New Jersey No Drawing. Application February 27, 1947,
Serial No. 731,414

4 Claims. (Cl. 260—78.4)

This invention relates to improvements in polymeric compositions. More particularly, the invention is concerned with the formation of new polymers resulting from the addition of a compound containing an active methylenic group ($>CH_2$) to a compound having ethylenic ($C=C$) linkages which are activated by a sulfone ($-SO_2-$) group adjacent said ethylenic linkages.

An object of the invention is to prepare such polymer compositions. A further object is to prepare such polymer compositions in the form of crystals, solids, oils, or thermoplastic resins. A still further object is to provide addition polymers which may be used as thermoplastic molding compositions, or in the production of synthetic films, and fibres. Other objects will be apparent from the hereinafter description.

Accordingly, the invention comprises the formation of a polymeric addition product of a donor compound of the formula $$R_1 - \overset{H_2}{\underset{}{C}} - R_2$$

and an acceptor compound of the formula $$H-\underset{X}{\overset{}{C}}=\underset{Y}{\overset{}{C}}-SO_2-(R_3SO_2)_n-\underset{Y}{\overset{}{C}}=\underset{X}{\overset{}{C}}H$$

It is believed, but without limitation thereto, that the addition product has the general formula $$\left( -\underset{R_2}{\overset{R_1}{\underset{|}{C}}}-\underset{X}{\overset{H}{\underset{|}{C}}}-\underset{Y}{\overset{H}{\underset{|}{C}}}-SO_2-(R_3SO_2)_n-\underset{Y}{\overset{H}{\underset{|}{C}}}-\underset{X}{\overset{H}{\underset{|}{C}}}- \right)_m$$

in which the essential coupling structural unit is $$-\underset{R_2}{\overset{R_1}{\underset{|}{C}}}-\underset{X}{\overset{H}{\underset{|}{C}}}-\underset{Y}{\overset{H}{\underset{|}{C}}}-SO_2-$$

$R_1$ and $R_2$ are selected from the group consisting of $-COOR$, $-COR$, $-CN$, $-CONH_2$, $-CONHR$, $-SO_2R$; R is any organic radical free from functional groups, i. e., free from radicals or groups which are reactive during the conversion to the polymer; X and Y are radicals selected from the group consisting of hydrogen, alkyl, and aryl; $m$ is an integer of variable value according to the degree of polymerization; $R_3$ is a divalent aliphatic radical free of functional groups; $n$ is zero or one.

$R_3$ may be represented by groups such as $-CH_2 \cdot CH=CH \cdot CH_2-$;
$-CH_2 \cdot CH_2 - O - CH_2 \cdot CH_2-$;
$-CH_2 \cdot CH_2 \cdot CH_2 \cdot CH_2-$;

or radicals such as methylene, ethylene, propylene-1,3, amylene-1,5, hexylene-1,6, heptylene-1,7, propylene-1,2, amylene-1,4, hexylene-1,4, heptylene-1,5, etc.

The molecule supplying the active hydrogen atoms is referred to as the donor, and the molecule containing the ethylenic linkage is referred to as the acceptor. High molecular weight polymers are achieved by the use of substantially stoichiometric equivalents of the donor and of the acceptor, the use of the donor in excess causes the molecular weight to drop whereby viscous liquids to low melting solids useful as lubricants, plasticizers, and the like are obtained. It will be noted that in the general formula above for the addition polymer, that hydrogen (from the methylene group of the donor) is added to the carbon alpha to the sulfone group of the structural unit. However, some of the hydrogen addition during the reaction may take place on the beta carbon atom to the sulfone group as illustrated by the unit $$-\underset{X}{\overset{R_1}{\underset{|}{C}}}-\underset{Y}{\overset{H\ H\overset{|}{C}-R_2}{\underset{|}{C}}}-SO_2-$$

In either case a polymer would be formed.

In the acceptor compound, the terminal ethylenic groups, preferably vinyl $$(H_2C=\overset{H}{\underset{}{C}}-)$$

groups, are activated through conjugation with an intermediate sulfone-containing group in which $-SO_2-$ is adjacent each ethylenic linkage. This is illustrated by $$CH_2=\overset{H}{\underset{}{C}}-SO_2-\overset{H}{\underset{}{C}}=CH_2$$

by $$CH_2=\overset{H}{\underset{}{C}}-SO_2-\vdots CH_2-CH_2-CH_2-CH_2-SO_2-\vdots \overset{H}{\underset{}{C}}=CH$$

as well as by $$CH_2=\overset{H}{\underset{}{C}}-SO_2-\vdots CH_2-CH_2-O-CH_2-CH_2-SO_2-\vdots \overset{H}{\underset{}{C}}=CH_2$$

The dotted lines embrace the $R_3SO_2$ group.

Exemplary of donors are: methyl malonate, ethyl malonate, allyl malonate, butyl malonate, ethyl acetoacetate, propyl acetoacetate, ethyl cyanoacetate, allyl cyanoacetate, malononitrile, malonamide, malonanilide, acetyl acetone, and bis-(methyl sulfonyl) methane.

Exemplary of acceptors are:

| Acceptor | Acceptor Formula |
| --- | --- |
| Vinyl sulfone | $CH_2=CHSO_2CH=CH_2$ |
| Propenyl sulfone | $(CH_3CH=CH)_2SO_2$ |
| Isopropenyl sulfone | $(CH_2=CCH_3)_2SO_2$ |
| 1,2-Bis (vinyl sulfonyl) ethane | $CH_2=CHSO_2CH_2CH_2SO_2CH=CH_2$ |
| 1,4-Bis (vinyl sulfonyl) butane | $CH_2=CHSO_2(CH_2)_4SO_2CH=CH_2$ |
| Bis (vinyl sulfonyl) methane | $(CH_2=CHSO_2)_2CH_2$ |
| Styryl sulfone | $(C_6H_5CH=CH)_2SO_2$ |
| (Alpha-ethyl vinyl) sulfone | $(CH_2=C(C_2H_5))_2SO_2$ |
| (Alpha n-propyl vinyl) sulfone | $(CH_2=C(C_3H_7))_2SO_2$ |
| 1-Butenyl sulfone | $(C_2H_5CH=CH)_2SO_2$ |
| (Alpha phenyl vinyl) sulfone | $(CH_2=C(C_6H_5))_2SO_2$ |
| Bis (beta,beta'-vinyl sulfonyl) ethyl ether | $(CH_2=CHSO_2CH_2CH_2)_2O$ |

The polymerization is conveniently carried out by mixing a basic catalyst (namely, one having a pH of at least 8.8 at an 0.1 molal concentration in water) with the donor and acceptor, and is done cautiously as the reaction is frequently exothermic. The mixture is heated to complete the reaction. Mixtures of donors or acceptors, or both, may be used to vary the properties of the final polymers. In general, the addition of a third monomer tends to reduce the softening point and the crystallinity of the resulting resin. The molecular weight may be controlled by the addition to the monomers of a monofunctional donor compound such as methyl diethyl malonate capable of terminating the polymer chain; others are ethyl α-cyanopropionate, α-cyano ethyl benzine, 2-nitro-propane. Further, suitable inert solvents may be used including such as dioxane, chloroform, benzene, toluene, diethyl ether, ethylene dichloride, ethyl acetate, acetone, formamide, and the like.

Examples of basic catalysts include ammonia, primary, secondary, and tertiary amines, quaternary ammonium hydroxides, alkali and alkali earth metals, their oxides, hydroxides, hydrides, amides, carbonates, and fatty acid salts. More specific examples are ethylamine, butylamine, cyclohexylamine, dimethylamine, piperidine, triethylamine, tributylamine, trimethyl benzyl ammonium hydroxide, tetramethyl ammonium hydroxide, potassium hydroxide, sodium hydroxide, sodium methoxide potassium ethoxide, sodium hydride, sodamide, phenyl lithium, potassium carbonate, sodium, potassium, barium and calcium metals, sodium acetate, potassium acetate, sodiodiethyl malonate, etc.

The amount of catalyst is small, satisfactory polymerizations being obtained with as little as one thousandth to one hundredth molar percent. In most cases the polymerization proceeds rapidly at room temperature and requires external cooling. In many cases the reaction can be controlled by using a relatively weak catalyst such as sodium acetate at first, followed by a stronger catalyst such as sodium methoxide after the initial reaction has subsided. Satisfactory polymerizations are obtained at temperatures varying from 0° C. to about 250° C. Still lower temperatures may be employed at a sacrifice in reaction times, while higher temperatures are limited by the stability of the reactants or their polymers. Reduced pressures or superatmospheric pressures may be employed, if desired.

The polymerization is usually allowed to proceed until it has substantially exhausted itself. It may be terminated at any time by the addition of acids. Acids such as acetic acid and oxalic are particularly desirable since they often reduce the color of the final polymer.

Polymers produced by this process may vary from viscous oils to hard solid resins. Linear, fusible polymers are obtained when both donor and acceptor contain two functional groups each. Insoluble, infusible, cross-linked polymers are obtained when either donor or acceptor, or both, contain more than two functional groups. Product variations in both of these types may be achieved by varying the degree of polymerizations.

The cross-linked polymers at low degrees of polymerization may be used as adhesives and tackifiers while at higher degrees of polymerization they may be used, depending upon the monomers employed, as flexible resins, coating materials and the like.

The following examples are intended to illustrate, but not to limit, my invention, parts being by weight:

*Example 1*

To a mixture of 0.005 mole each of ethyl malonate and vinyl sulfone is added one drop of a saturated solution of sodium methoxide in methanol. The polymerization is very vigorous and the mixture reaches the boiling point within a few seconds. On cooling, the copolymer sets to a hard, brown, fusible resin.

*Example 2*

Approximately 0.02 g. of sodium is warmed with 6.40 g. of ethyl malonate until solution is complete and 200 ml. of chloroform is added. To this solution, over a period of 5 minutes, is added 4.72 g. of vinyl sulfone in 100 ml. of chloroform. The temperature is maintained at 50° C. by means of an oil bath. The solution gels within a minute after the completion of the addition and the gel becomes opaque after 20 minutes. A slight pink color develops when the mixture is held for 2 days at 50° C. but disappears when 5 ml. of formic acid is added to stop the reaction. The mixture is then stirred into 500 ml. of light petroleum ether and the precipitated copolymer is filtered and dried at 60° C. It is pure white, weighs 9.2 g. and melts at 120–130° C. to a viscous liquid.

The copolymer is insoluble in both aqueous acids and alkalis. It appears to dissolve in a number of hot organic solvents such as pyridine and nitrobenzene, but the solutions gel at room temperature even in concentrations as low as 0.2 percent. X-ray studies indicate it to be highly crystalline. Extrusion of the molten polymer through an orifice yields fibers which show the phenomenon of cold drawing.

*Example 3*

A mixture of 0.005 mole each of ethyl malonate and vinyl sulfone is added with stirring to 5 ml. of 20 percent aqueous sodium hydroxide solution. The white copolymer forms immediately and floats on the surface of the solution which reaches a temperature of about 50° C. The copolymer appears to be identical with the product of Example 2.

Example 4

A mixture of 0.005 mole each of ethyl malonate and vinyl sulfone is treated with 2 drops of piperidine. There is no immediate reaction but the mixture slowly polymerizes over a period of 2 days at 90° C. to give a solid copolymer similar to that of Example 2.

Example 5

A mixture of 0.005 mole each of ethyl malonate and vinyl sulfone is treated with a drop of an aqueous 38 percent solution of benzyl trimethyl ammonium hydroxide. The mixture becomes hot and, on cooling, sets to a solid resin similar to that of Example 2.

Example 6

A small sliver of sodium is dissolved in 200 ml. of acetone and a mixture of 0.10 mole each of ethyl malonate and vinyl sulfone is added with stirring at such a rate that the solution temperature remains at about 50° C. The solution first becomes viscous, then gels, and finally, after about 15 minutes, becomes very stiff as the white copolymer precipitates. The acetone is evaporated and the polymer melted by heating to 150° C. The original melt is quite fluid, indicating a low degree of polymerization but on standing overnight at 150° C. polymerization continues and the molten polymer becomes very viscous. Filaments prepared by drawing a rod from the molten polymer can be cold drawn and possess considerable tensile strength.

Example 7

A sliver of sodium is dissolved in 15.36 g. of ethyl malonate and 11.718 g. of vinyl sulfone is added slowly with stirring. The addition requires 10 minutes to keep the reaction temperature at about 100° C. The low viscosity, colorless oil (at 100° C.) is heated to 170° C. in an atmosphere of nitrogen and it increases in viscosity. After an hour, the melt yields filaments which will cold draw. The melt viscosity increases noticeably for about 3 hours but little further change, except a slight darkening, is noted when the heating is continued for 3 days. Filaments drawn from the melt are quite flexible originally and can be drawn into hard knots. On standing, however, they become brittle. The bulk polymer on cooling gives a hard, tough, transparent resin which slowly becomes brittle.

Example 8

Using the technique of Example 7, 10.65 g. of butyl malonate is copolymerized with 5.976 g. of vinyl sulfone. After an hour at 165° C. the viscous melt yields filaments which can be cold drawn. After 24 hours at 165° C., the polymer, on cooling, is a flexible, brown resin which melts or softens at about 100° C.

Example 9

Using the technique of Example 7, a mixture of 14.40 g. ethyl malonate and 1.13 g. of ethyl cyanoacetate is copolymerized with 11.80 g. of vinyl sulfone. After 18 hours at 170° C., filaments can be drawn from the viscous melt and, on cooling, a tough, brown resin is obtained which adheres very tenaciously to the glass container. The terpolymer is appreciably less brittle than the copolymer of Example 7.

Example 10

Using the technique of Example 7, a mixture of 11.28 g. of ethyl malonate and 1.04 g. ethyl acetoacetate is copolymerized with 9.375 g. of vinyl sulfone. After 30 minutes at 170° C., filaments can be drawn from the viscous melt. After 5 hours at 170° C., the melt is cooled, giving a tough, hard, brown terpolymer.

Example 11

Ethyl malonate (8.00 g.) containing 0.001 g. of dissolved sodium is treated with 3.54 g. of vinyl sulfone with no apparent reaction. The mix is heated to 130° C. at which point an exothermic reaction begins which carries the temperature to 200° C. After cooling to 130° C., 2.36 g. more vinyl sulfone is added without causing any further reaction. The addition of 0.1 g. of ethyl malonate containing 1 percent dissolved sodium causes further polymerization and a solid resin is obtained.

This Example 11 demonstrates that as little as 0.007 percent dissolved sodium, based on the final weight, is sufficient to catalyze the polymerization.

Example 12

A mixture of 0.005 mole each of vinyl sulfone and diethyl malonate is treated with 0.1 ml. of triethylamine in 1 ml. of water, giving two layers. Within 15 minutes the oil layer becomes cloudy and the solid copolymer begins to separate. After 15 hours at room temperature, the oil phase is completely transformed to the solid copolymer.

Example 13

A mixture of 0.005 mole each of vinyl sulfone and ethyl malonate is treated with 1 ml. of a saturated solution of sodium acetate in water. There is no visible reaction after 15 hours at room temperature and the sample is placed in a 70° C. oven. After 4 hours the oil phase is noticeably viscous. The polymerization is completed at 60° C. giving, after 48 hours, the solid copolymer mixed with crystals of sodium acetate.

Example 14

A mixture of 0.005 mole each of vinyl sulfone and malonanilide is heated to complete solution and treated with a drop of a saturated solution of sodium methoxide in methanol. A vigorous reaction occurs and, on cooling, a solid, dark copolymer is obtained.

Example 15

A mixture of 0.005 mole each of vinyl sulfone and malonamide is heated to complete solution and treated with a drop of a saturated solution of sodium methoxide in methanol. A vigorous reaction occurs, giving a dark solid resin.

The same copolymer is obtained by adding 0.01 mole of vinyl sulfone to 0.01 mole of malonamide dissolved in 10 ml. of warm foramide containing a sliver of dissolved sodium. The solution becomes warm. After 30 minutes it is poured into 100 ml. of water and the white copolymer is filtered, washed with methanol and air dried. The copolymer melts to a viscous liquid at 200–220° C.

Example 16

A small piece of sodium is dissolved in 0.01 mole of ethyl acetoacetate in 10 ml. of chloroform and 0.01 mole of vinyl sulfone is added. The heat of the reaction causes the chloroform to boil and the solution becomes viscous. After 30 minutes at room temperature, the solvent is evaporated leaving a colorless, hard resin.

While I have shown and described various embodiments of the invention, it is to be understood that the invention is susceptible to other modifications which appear within the spirit of the invention and the scope of the appended claims.

Having thus described my invention, what I claim and desire to protect by Letters Patent is:

1. A polymeric addition product of divinyl sulfone and an alkyl malonate.
2. A polymeric addition product of divinyl sulfone and ethyl acetoacetate.
3. A polymeric addition product of divinyl sulfone, ethyl cyanoacetate, and ethyl malonate.
4. A polymeric addition product of a compound of the formula

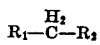

and a compound of the formula

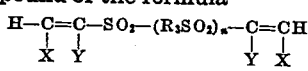

where $n$ represents a whole number selected from 0 and 1; $R_1$ and $R_2$ are selected from the group consisting of —COOR, —COR, —CN, —CONH$_2$, —CONHR, —SO$_2$R; R represents unreactive hydrocarbon; X and Y are radicals selected from the group consisting of hydrogen, alkyl, and aryl; $R_3$ is a divalent organic radical selected from the class consisting of alkylene and oxy bis-alkylene radicals.

DWIGHT L. SCHOENE.

REFERENCES CITED

The following references are of record in the file of this patent:

Suter, "The Organic Chemistry of Sulfur," published by John Wiley and Sons, N. Y., 1944, page 726.

Kohler et al., "The properties of unsaturated sulfur compounds," Journal of the American Chemical Society, vol. 57, pages 1316–1321, July 1935.

Norrish et al., "The formation and structure of polymers of the insoluble cross-linked type," Proc. Royal Soc. (1937), A 163, pages 205–220.

Certificate of Correction

Patent No. 2,493,364                  January 3, 1950

DWIGHT L. SCHOENE

It is hereby certified that error appears in the printed specification of the above numbered patent requiring correction as follows:

Column 2, line 42, extreme right-hand portion thereof, for $$\overset{H}{C}=CH \quad \text{read} \quad \overset{H}{C}=CH_2$$

and that the said Letters Patent should be read with this correction therein that the same may conform to the record of the case in the Patent Office.

Signed and sealed this 11th day of April, A. D. 1950.

[SEAL]

THOMAS F. MURPHY,
*Assistant Commissioner of Patents.*